United States Patent [19]

Mora

[11] Patent Number: 4,554,607
[45] Date of Patent: Nov. 19, 1985

[54] FUSE LOSS INDICATING CIRCUIT

[75] Inventor: Erwin P. Mora, Mt. Clemens, Mich.

[73] Assignee: Dana Corporation, Toledo, Ohio

[21] Appl. No.: 428,502

[22] Filed: Sep. 29, 1982

[51] Int. Cl.$^4$ .................. H02H 5/04; G08B 21/00
[52] U.S. Cl. .............................. 361/104; 340/638; 340/639; 361/23
[58] Field of Search .............. 340/638, 639, 636; 361/104, 23, 30, 31, 32, 33, 34, 41; 307/311

[56] References Cited

U.S. PATENT DOCUMENTS

| | | | |
|---|---|---|---|
| 3,546,692 | 12/1970 | Salzer | 340/639 X |
| 4,038,584 | 7/1977 | Tarchalski et al. | 361/104 |
| 4,041,331 | 8/1977 | Westerman et al. | 307/315 X |
| 4,063,302 | 12/1977 | Donig et al. | 361/104 X |
| 4,177,668 | 12/1979 | Holmberg | 340/636 X |
| 4,356,481 | 10/1982 | Kuki | 340/636 |

FOREIGN PATENT DOCUMENTS 136085  6/1979  Fed. Rep. of Germany ...... 340/638

Primary Examiner—James L. Rowland
Assistant Examiner—Daniel Myer
Attorney, Agent, or Firm—Fraser & Clemens

[57] ABSTRACT

The present invention relates to a fuse loss indicating system for monitoring the condition of a plurality of fuses in an electric circuit. The indicating system includes a plurality of individual indicator circuits, one for each fuse to be monitored. Each indicator circuit includes an optical isolator for electrically isolating the indicator circuit from the monitored circuit. When a monitored fuse blows, the associated optical isolator triggers a flip flop to generate a fuse loss signal to cause a warning LED to light and alert an operator as to which fuse has blown. In its preferred embodiment, the fuse loss indicating system is utilized to monitor the fuses in an SCR motor bridge circuit. In this embodiment, the fuse loss system also generates a bridge disable signal when a fuse blows to cause a bridge lockout circuit to disable the gating signals to the SCR's, thereby disconnecting power from the motor.

3 Claims, 1 Drawing Figure

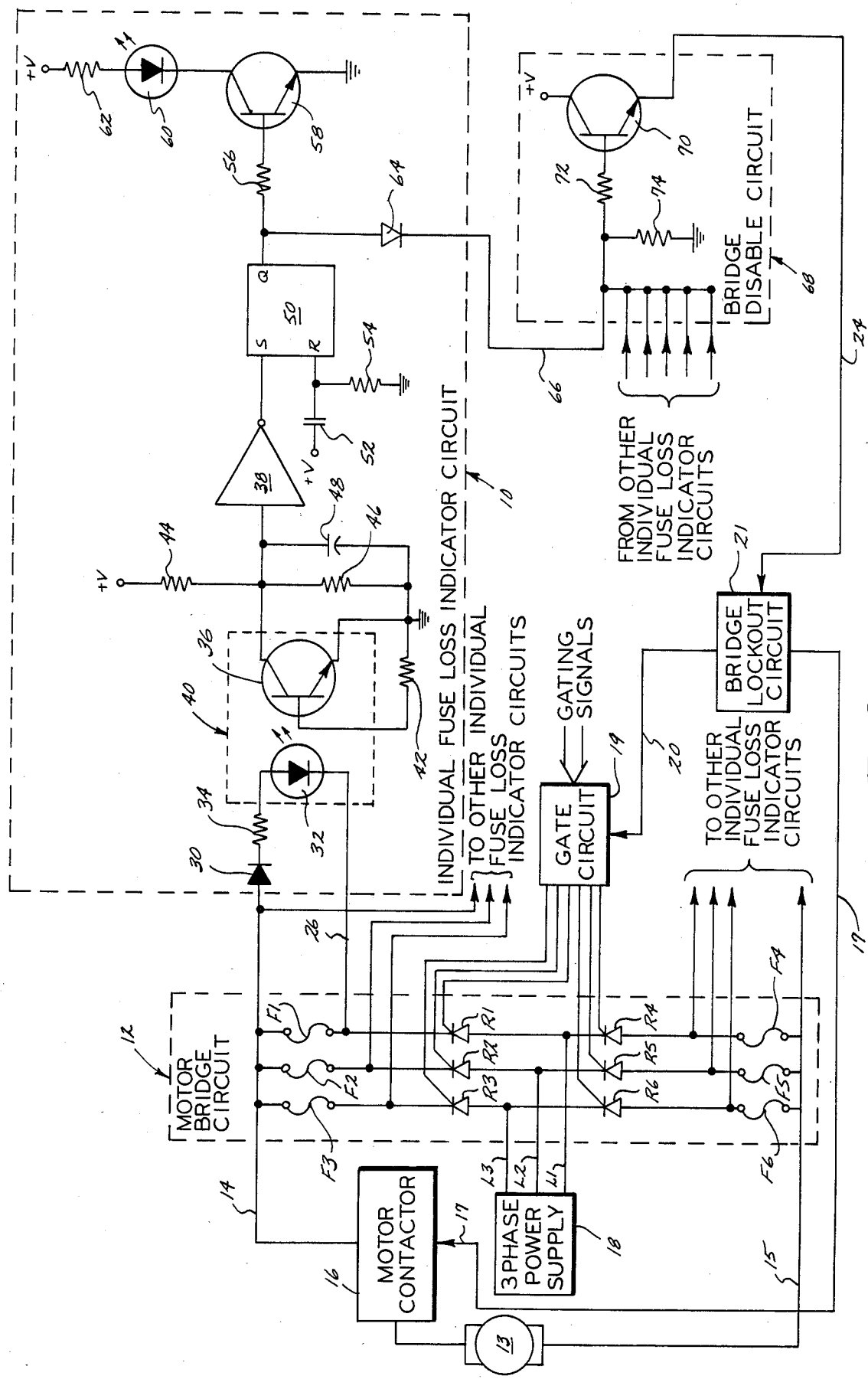
FIG. I

FUSE LOSS INDICATING CIRCUIT

BACKGROUND OF THE INVENTION

The present invention relates generally to a circuit for monitoring the status of a fuse in an electric circuit and, in particular, to a circuit for monitoring the status of a plurality of fuses in a motor bridge circuit.

Electric power circuits are typically protected by a fuse connected between a power source and the electric circuit for limiting the maximum current which can be supplied to the circuit. In many instances, a circuit incorporates a plurality of fuses for separately protecting against the application of excess current to individual portions or components of a circuit.

In circuits which utilize more than a single fuse element, it is desirable to provide an indication to an operator in the event one of the fuses should blow. One such fuse indicating system is disclosed in U.S. Pat. No. 2,317,030 to Colvin. The Colvin fuse indicating system includes a separate current-limiting resistor and an associated indicator lamp connected in series across each fuse to be monitored. When one of the fuses blows, current passes through the current-limiting resistor, causing the indicator lamp to light. However, the Colvin system relies on the power source connected to the monitored fuse in order to light the associated indicator light.

A fuse loss indicating system which utilizes an auxiliary power supply to power an indicator light is disclosed in U.S. Pat. No. 3,512,073 to South. In the South patent, a transformer is coupled to actuate a switching means to light the indicator lamp in the event a monitored fuse blows. However, since only a simple indicator is provided, the operator has no indication as to which one of a plurality of fuses has blown.

A fuse testing circuit is disclosed in U.S. Pat. No. 3,407,293 to Tonnessen. The fuse testing circuit of the Tonnessen patent includes a plurality of relays for sequentially connecting the fuse testing circuit to the fuses to be tested. When one of the fuses has blown, a test of the blown fuse causes the output of a flip flop to be set to a logic "1" state. The logic "1" output of the flip flop triggers a warning circuit to energize a flashing lamp to alert the operator that a fuse has blown. While the Tonnessen circuit is capable of testing a plurality of fuses and providing an indication if one of the fuses should be blown, the circuit has at least two drawbacks. Since only one indicator lamp is utilized, the operator has no indication as to which one of a plurality of fuses has blown. Furthermore, the Tonnessen circuit is merely a fuse testing circuit, and therefore does not continuously monitor the condition of the fuses.

Other fuse loss indicating systems are disclosed in U.S. Pat. No. 3,045,167 to Colaiaco and U.S. Pat. No. 3,546,692 to Salzer.

SUMMARY OF THE INVENTION

The present invention provides a fuse loss indicating system which includes a plurality of individual indicator circuits, one for each fuse to be monitored. Each indicator circuit is electrically isolated from the associated fuse by means of an optical isolator consisting of an LED and associated phototransistor. This arrangement tends to minimize any damage to the components of the indicator circuit as a result of an overload in the monitored circuit.

The LED of the optical isolator is connected to monitor the voltage across its associated fuse. When the voltage exceeds a predetermined amount, the LED will light, causing the phototransistor to turn on. The phototransistor is connected to trigger a latching means such as a flip flop to generate a fuse loss signal at a logic "1" state at its output. A fuse loss signal at a logic "1" lights an associated LED indicator, thus alerting an operator as to which particular fuse has blown.

In its preferred embodiment, the fuse loss indicating system is utilized to monitor the fuses in an SCR motor bridge circuit. In this embodiment, in addition to providing the operator with an indication of a blown fuse, the fuse loss system also generates a bridge disable signal when a fuse blows. A bridge lockout circuit is responsive to the bridge disable signal for removing the gating signals to the SCR's and thus removing power to the motor, thereby preventing damage to the bridge circuit.

BRIEF DESCRIPTION OF THE DRAWING

FIG. 1 is a schematic diagram of a fuse loss indicating system according to the present invention, with the system connected to monitor the fuses of a conventional motor bridge circuit.

DESCRIPTION OF THE PREFERRED EMBODIMENT

It should be noted at the outset of this description that the term "fuse", as used throughout this description and in the appended claims, refers not only to conventional protective devices having fusible elements, but also to all types of electronic components which function to open a circuit during overload conditions. For example, the term "fuse" includes other overload circuit protective devices such as conventional circuit breakers.

Referring to FIG. 1, there is shown a schematic diagram of an individual fuse loss indicator circuit 10 embodying the principles of the present invention. The fuse loss circuit 10 is connected to monitor the condition of one of a plurality of fuses in a motor bridge circuit 12. The motor bridge circuit 12 is a conventional, three-phase, full wave bridge converter connected to supply electrical power to a motor armature 13 on lines 14 and 15. A motor contactor 16 is connected between the line 14 and the motor armature 13. The motor contactor 16 receives a control signal on a line 17 for opening or closing the motor contactor. The motor bridge circuit 12 is connected to receive a three-phase alternating current power signal on lines L1, L2, and L3 from a three-phase power supply 18.

The motor bridge circuit 12 includes a bridge circuit of six silicon controlled rectifiers (SCR's) R1 through R6 for converting the three-phase power signal on the lines L1, L2, and L3 to direct current power on the lines 14 and 15. A separate one of a plurality of fuses F1 through F6 is connected in series with a respective one of the SCR's R1 through R6. The SCR's R1, R2, and R3 have anodes connected to the incoming power lines L1, L2, and L3, respectively, and have cathodes connected through fuses F1, F2, and F3, respectively, to the power line 14. The SCR's R4, R5, and R6 have cathodes connected to the incoming power lines L1, L2, and L3, respectively, and have anodes connected through fuses F4, F5, and F6, respectively, to the power line 15. In operation, the SCR's R1, R2, and R3 supply the positive polarity portion of the three-phase signal to the motor armature 13 on the line 14, while the SCR's R4, R5, and R6 supply the negative polarity portion of the three-phase power signal to the motor armature 13 on the line 15.

Each of the SCR's R1 through R6 has a gate connected to receive a separate gate control signal from a gate circuit 19. The gate circuit 19 is connected to receive gating signals from motor control circuitry not shown in the drawings. The gate circuit 19 is also connected to receive a control signal on a line 20 from a bridge lockout circuit 21. The bridge lockout circuit 21 includes control logic responsive to a bridge disable signal on a line 24 for generating the control signals on the lines 17 and 20. As will be discussed, when the bridge lockout circuit 21 receives the bridge disable signal on the line 24, the circuit 21 generates a control signal on the line 20 to disable the gate circuit 19 and prevent gating signals from being supplied to the SCR's. The circuit 21 also generates a control signal on the line 17 to open the motor contactor 16.

The fuse loss indicator circuit 10 functions to monitor the condition of the fuse F1 and is specifically connected to sense the voltage across the fuse F1. As shown in FIG. 1, the circuit 10 is connected to the line 14 and a line 26 which in turn is connected to the junction between the fuse F1 and the cathode of the SCR R1. The fuse loss indicator circuit 10 is representative of five other similar indicator circuits (not shown) which are connected in a similar manner to monitor the condition of the fuses F2 through F6. For example, the indicator circuit which monitors the fuse F2 is connected to the line 14 and a line 28 connected to the junction between the fuse F2 and the cathode of the SCR R2.

The line 14 is connected to the anode of a diode 30 having a cathode connected to the anode of an LED 32 through a resistor 34. The LED 32 has a cathode connected to the line 26. A phototransistor 36 is responsive to the light emitted by the LED 32 and has a collector connected to the input of an inverter 38. The LED 32 and the phototransistor 36 comprise an optical isolator 40 which functions to electrically isolate the fuse loss indicator circuit 10 from the motor bridge circuit 12. This prevents any substantial electrical damage to the fuse loss circuit 10 in the event an excessive voltage signal is present across the fuse F1.

The transistor 36 has a base connected to the ground potential through a resistor 42 and an emitter connected directly to the ground potential. A resistor 44 is connected between a +V power supply (not shown) and the collector of the transistor 36, while another resistor 46 is connected in parallel with a capacitor 48 between the collector of the transistor 36 and the ground potential.

The output of the inverter 38 is connected to the set input S of a flip flop 50. The reset input R of the flip flop 50 is connected to the +V power supply through a capacitor 52 an to the ground potential through a resistor 54. As will be discussed, when the fuse F1 blows, the flip flop 50 generates a fuse loss signal at an output terminal Q. The output Q of the flip flop 50 is connected through a resistor 56 to the base of a transistor 58 having an emitter connected to the ground potential. The collector of the transistor 58 is connected to the cathode of a fuse loss indicating LED 60 having an anode connected to the +V power supply through a resistor 62.

The output Q of the flip flop 50 is also connected to the anode of the diode 64 having a cathode connected to a line 66 to supply the fuse loss signal to a bridge disable circuit 68. The bridge disable circuit 68 includes a transistor 70 having a base connected to receive the fuse loss signal on the line 66 through a resistor 72. The line 66 is connected to the ground potential through another resistor 74. The transistor 70 is also connected to receive similar fuse loss signals through the resistor 72 from the other fuse loss indicator circuits. The transistor 70 has a collector connected to the +V power supply and an emitter connected to generate the bridge disable signal on the line 24.

Basically, each one of the plurality of individual fuse loss indicator circuits functions to monitor a selected one of the fuses in the motor bridge circuit 12. When one of the fuses opens, i.e., blows, the respective indicator circuit will cause the respective fuse loss indicator LED to light, thus informing the operator as to which fuse has blown. At the same time, the fuse loss circuit will generate a fuse loss signal to the bridge disable circuit 68 which in turn signals the bridge lockout circuit 21 to disable the gating signals to the SCR's R1 through R6 and effectively cut off power to the motor armature 13, thus preventing any damage to the motor bridge circuit.

The specific operation of the fuse loss indicator circuit 10 will now be discussed. Upon connection of the +V power supply to the fuse loss indicator circuit 10, the voltage supplied to the reset input R of the flip flop 50 will change from the +V power supply voltage to a lower predetermined voltage as the capacitor 52 charges through the resistor 54. This transition at the reset input R causes the output Q of the flip flop 50 to be set to a logic "0" near ground potential. A logic "0" at the output of the flip flop 50 maintains the transistor 58 and the bridge disable transistor 70 in an off state.

Under normal operating conditions, the voltage across the fuse F1 is too low to provide sufficient current through the diode 30 and the resistor 34 to light the LED 32. This maintains the phototransistor 36 in an off state and the voltage at the input to the inverter 38 at a logic "1" near a positive polarity determined by the voltage divider of resistors 44 and 46. The inverter 38 inverts the logic "1" signal and supplies a logic "0" signal to the set input S of the flip flop 50. As long as the set input of the flip flop 50 remains at logic "0", there will be no change at the output Q, which will remain at logic "0".

When the fuse F1 blows, there is momentarily a high open circuit voltage across the fuse F1 which causes a sufficient current to flow through the diode 30 and the resistor 34 and light the LED 32. The light emitted by the LED 32 causes the phototransistor 36 to turn on and generate a logic "0" signal near ground potential to the input of the inverter 38. The inverter 38 converts this logic "0" signal to a logic "1" signal which is supplied to the set input S of the flip flop 50. The "0" to "1" transition at the set input S causes the output Q of the flip flop 50 to generate a fuse loss signal at logic "1".

A fuse loss signal at logic "1" causes the transistors 58 and 70 to turn on. When the transistor 58 is on, current flows through the resistor 62 and causes the LED 60 to light, thus indicating to the operator that the fuse F1 has blown. At the same time, the transistor 70 turns on to generate the bridge disable signal on the line 24 to the bridge lockout circuit 21 which generates a control signal on the line 20 to disable the gating signals to the SCR's R1 through R6, thereby removing power from the motor armature 13. The bridge lockout circuit 21 also generates a control signal on the line 17 to open the motor contactor 16.

While the fuse loss indicating system of the present invention has been described with reference to a motor bridge circuit, it will be appreciated that the present invention could be utilized with other types of electrical circuits incorporating one or more fuses.

In accordance with the provisions of the patent statutes, the principle and mode of operation of the invention have been explained and illustrated in its preferred embodiment. However, it must be understood that the invention can be practiced otherwise than as specifically illustrated and described without departing from its spirit or scope.

What is claimed is:

1. In an SCR motor bridge circuit including a power source, at least one fuse for limiting the amount of current supplied by the power source to a motor, a gate circuit for supplying gating signals to the SCR's, and a normally closed motor contactor for supplying power to the motor armature, a fuse loss monitoring and protection circuit comprising:

optical isolator means coupled to monitor the one fuse for generating a set signal when the one fuse has opened;

latching means responsive to said set signal for generating a fuse loss signal;

indicator means responsive to said fuse loss signal for indicating that the one fuse has opened; and protection means responsive to said fuse loss signal for generating a first disable signal to the gate circuit for disconnecting the gate circuit for supplying the gating signals from the SCR's and for generating a second disable signal to the motor contactor for opening the motor contactor.

2. A fuse loss monitoring circuit according to claim 1 wherein said optical isolator means includes an LED connected to the one fuse for emitting light when the one fuse opens, a phototransistor responsive to said light for generating an output signal, means for inverting said output signal to generate said set signal, said latching means including a flip flop responsive to said set signal for generating said fuse loss signal.

3. A fuse loss circuit according to claim 2 wherein said means for generating a bridge disable signal includes a transistor connected between said flip flop and the bridge lockout circuit.

* * * * *